US006953228B2

(12) United States Patent
Leske et al.

(10) Patent No.: US 6,953,228 B2
(45) Date of Patent: *Oct. 11, 2005

(54) ACTUATING DEVICE FOR A BRAKE UNIT OF AN ELECTRONICALLY CONTROLLED VEHICLE BRAKE SYSTEM

(75) Inventors: Olaf Leske, Langenhagen (DE); Bernd Christoffers, Wennigsen (DE)

(73) Assignee: WABCO GmbH & Co. oHG, Hannover (DE)

( * ) Notice: Subject to any disclaimer, the term of this patent is extended or adjusted under 35 U.S.C. 154(b) by 21 days.

This patent is subject to a terminal disclaimer.

(21) Appl. No.: 10/453,838

(22) Filed: Jun. 3, 2003

(65) Prior Publication Data

US 2004/0026182 A1  Feb. 12, 2004

(30) Foreign Application Priority Data

Jun. 5, 2002 (DE) ................. 102 24 805

(51) Int. Cl.⁷ ................. B60T 15/04; B60T 15/08
(52) U.S. Cl. ................. 303/15; 188/156; 188/158; 303/3; 303/20; 303/50
(58) Field of Search ................. 303/3, 20, 155, 303/15, 118.1, 50–56, 113.4; 188/156–165, 188/1.11 R, 1.11 E, 106 P; 74/512, 514; 91/367, 376 R, 369.1; 60/545, 534; 324/207.2; 338/32 H, 207.11

(56) References Cited

U.S. PATENT DOCUMENTS

| 3,937,527 A | * | 2/1976 | Eckhart ................. 303/40 |
| 4,161,341 A | * | 7/1979 | Reinecke et al. ......... 303/52 |
| 4,480,663 A | | 11/1984 | Bergemann et al. |
| 4,784,442 A | * | 11/1988 | Petersen ................. 303/15 |
| 4,817,660 A | | 4/1989 | Deike et al. |
| 4,818,036 A | * | 4/1989 | Reinecke ................. 303/50 |
| 4,819,992 A | * | 4/1989 | Angelillo et al. ........... 303/20 |
| 5,115,186 A | * | 5/1992 | Reinartz et al. ....... 324/207.22 |
| 5,129,712 A | | 7/1992 | Feldmann et al. |
| 5,365,791 A | | 11/1994 | Padula et al. |
| 5,395,164 A | * | 3/1995 | Sulzyc ................. 303/15 |
| 5,439,275 A | * | 8/1995 | Padula et al. .......... 303/3 |
| 5,443,306 A | * | 8/1995 | Broome ................. 303/3 |
| 5,544,948 A | | 8/1996 | Schmidt et al. |
| 5,704,693 A | | 1/1998 | Mackiewicz |
| 5,831,232 A | | 11/1998 | Kushnir et al. |
| 6,053,205 A | | 4/2000 | Feldmann |
| 6,158,468 A | | 12/2000 | Feldmann |

(Continued)

FOREIGN PATENT DOCUMENTS

DE  11 16 084  5/1962

(Continued)

*Primary Examiner*—Douglas C. Butler
(74) *Attorney, Agent, or Firm*—Kramer Levin Naftalis & Frankel LLP (57) ABSTRACT

An actuating device for a brake unit of a vehicle EBS includes a tappet positioned in a housing of the brake unit for actuating a piston to operate a brake valve. A displacement sensor slide measures axial movement of the tappet. So that moving parts of the actuating device are guided with minimal friction and that torque acting on the tappet is compensated for, the tappet includes a base plate disposed non-rotatably in a receiver of a guide ring having spaced-apart oblong holes, a spacer ring disposed in the guide ring having angled edges which extend into the oblong holes, and a window on the guide ring protruding radially outwardly into a slit on the housing to receive the displacement sensor slide.

13 Claims, 6 Drawing Sheets

U.S. PATENT DOCUMENTS

| | | | |
|---|---|---|---|
| 6,192,685 B1 | 2/2001 | Bourlon et al. | |
| 6,233,932 B1 * | 5/2001 | Heibel et al. | 60/550 |
| 6,612,659 B2 * | 9/2003 | Fulks et al. | 303/113.4 |
| 6,651,784 B1 | 11/2003 | Barbosa et al. | |
| 2004/0026182 A1 * | 2/2004 | Leske et al. | 188/72.1 |
| 2004/0045777 A1 * | 3/2004 | Leske et al. | 188/152 |

FOREIGN PATENT DOCUMENTS

| | | | | |
|---|---|---|---|---|
| DE | 11 51 745 | | 2/1964 | |
| DE | 24 25 449 A | | 12/1975 | |
| DE | 2937657 | * | 4/1981 | |
| DE | 31 20 203 A1 | | 12/1982 | |
| DE | 37 15 148 A1 | | 11/1988 | |
| DE | 38 41749 A1 | | 6/1990 | |
| DE | 40 16 756 A1 | | 11/1991 | |
| DE | 42 36 045 A1 | | 11/1993 | |
| DE | 42 32 492 A1 | | 3/1994 | |
| DE | 44 17 184 A1 | | 11/1995 | |
| DE | 196 53 264 A1 | | 6/1998 | |
| DE | 197 01 069 A1 | | 7/1998 | |
| DE | 19823488 A1 | * | 1/1999 | B60T 15/08 |
| DE | 198 35 574 A1 | | 2/2000 | |
| DE | 10224804 A1 | * | 1/2004 | |
| DE | 10224805 | * | 3/2004 | |
| EP | 1042 148 | | 7/1999 | |
| EP | 001369329 A1 | * | 4/2003 | |
| EP | 001369328 A1 | * | 12/2003 | |
| EP | 001369329 A1 | * | 12/2003 | |
| JP | 59-118557 | * | 7/1984 | |

* cited by examiner

ACTUATING DEVICE FOR A BRAKE UNIT OF AN ELECTRONICALLY CONTROLLED VEHICLE BRAKE SYSTEM

BACKGROUND OF THE INVENTION

The present invention is directed generally to an actuating device for a brake unit of an electronically controlled vehicle brake system.

A typical electronically controlled vehicle brake system (EBS) is equipped with a purely pneumatic single circuit and with an electropneumatic circuit. The electropneumatic circuit includes, among other elements, an electronic control unit (ECU) and a brake signal transmitter with an integrated set value sensor designed as a displacement sensor, brake switch and proportional relay valve. The brake signal transmitter is connected mechanically to the vehicle brake pedal and electrically to the ECU. The brake signal transmitter (i.e., the brake unit) is provided with a tappet mechanically connected to the brake pedal and disposed in axially displaceable relationship inside the housing of the EBS brake unit. The tappet actuates a piston via a component that introduces some lost motion (i.e., idling stroke) and a spring braced against the piston and against the component. The piston operates a brake valve. The idling stroke (about 2 mm) is provided to ensure that the vehicle driver has some margin during brake actuation and does not instantly actuate the vehicle brakes. The tappet movement is communicated to the ECU by the displacement sensor, which is provided with one part in fixed position in the housing and with a slide that can move in axial direction together with the tappet, the slide engaging receiving means of the tappet.

Difficulties can arise in guiding the tappet and the component that introduces the lost motion (i.e., idling stroke) in such a way that minimizes friction. When the brake pedal is actuated, the tappet is exposed to not only an axial force, but also a torque which causes the tappet to twist around its longitudinal axis, especially when the mechanical connection to the brake pedal is a ball-and-socket joint. Under these conditions, the slide of the displacement sensor might slip out of its receiving means in the tappet or become damaged, thus making displacement sensing impossible or ineffective.

Accordingly, it is desired to provide an actuating device of the type under discussion in which the moving parts are guided with sufficiently low friction and any torque acting on the tappet is compensated for.

SUMMARY OF THE INVENTION

Generally speaking, in accordance with the present invention, an actuating device is provided which avoids the disadvantages of prior art actuating devices.

An actuating device is provided for use in a brake unit of a vehicle EBS. The actuating device includes a tappet which is axially movable in a brake unit housing and mechanically connected to the vehicle brake pedal, a piston actuated by the tappet for controlling a brake valve, and a displacement sensor slide movable with the tappet for determining the axial movement of the tappet. To guide the moving parts of the actuating device with sufficiently low friction and to compensate for any torque acting on the tappet, the tappet includes, at an end facing the piston, a base plate disposed non-rotatably in a receiving portion of a guide ring. The guide ring includes spaced-apart holes. A spacer ring in the guide ring provides a preselected amount of lost motion (i.e., idling stroke) to ensure that the vehicle driver has some margin during brake actuation and does not instantly actuate the vehicle brakes. The spacer ring includes angled edges extending therefrom into the spaced-apart holes. A window protruding radially outwardly from the guide ring extends into a guide slit defined in the housing for receiving an end of the displacement sensor slide.

Accordingly, it is an object of the present invention to provide an actuating device for a brake unit of a vehicle EBS constructed and arranged such that its moving parts are guided with minimal friction and that torque acting on the tappet is compensated for.

It is another object of the present invention to provide an actuating device that is cost effective to manufacture and assemble.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

Figure 1:
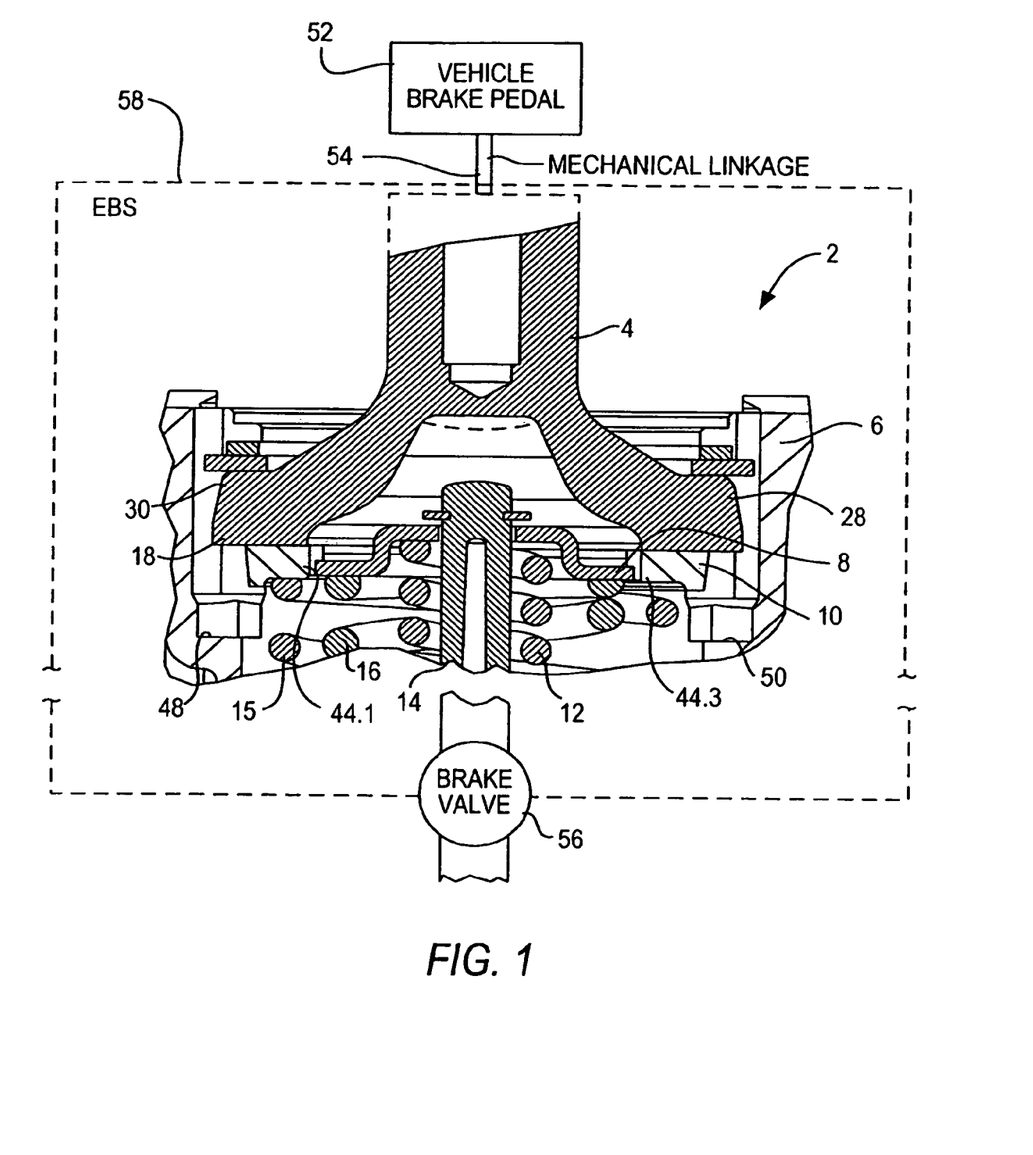
FIG. 1 is a cross-sectional view of an actuating device for a brake unit of a vehicle EBS constructed in accordance with a preferred embodiment of the present invention.
Figure 2:
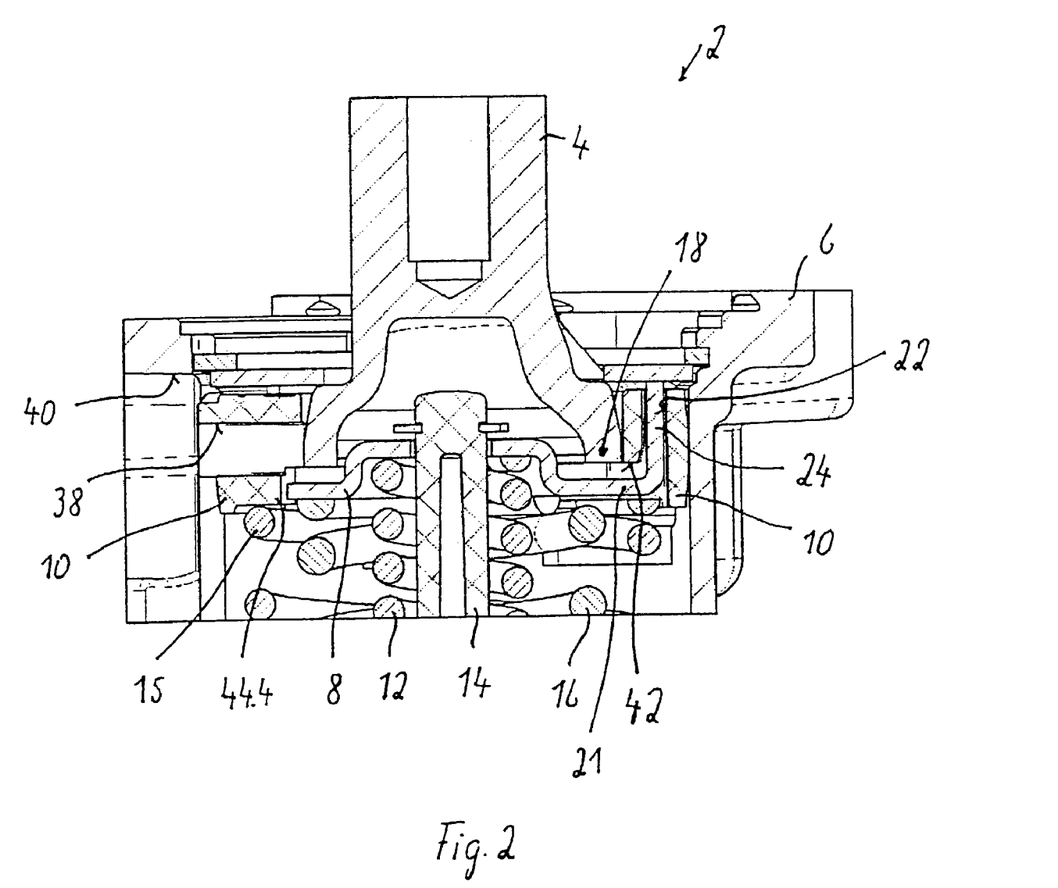
FIG. 2 is another cross-sectional view of the inventive actuating device depicted in FIG. 1.
Figure 3:
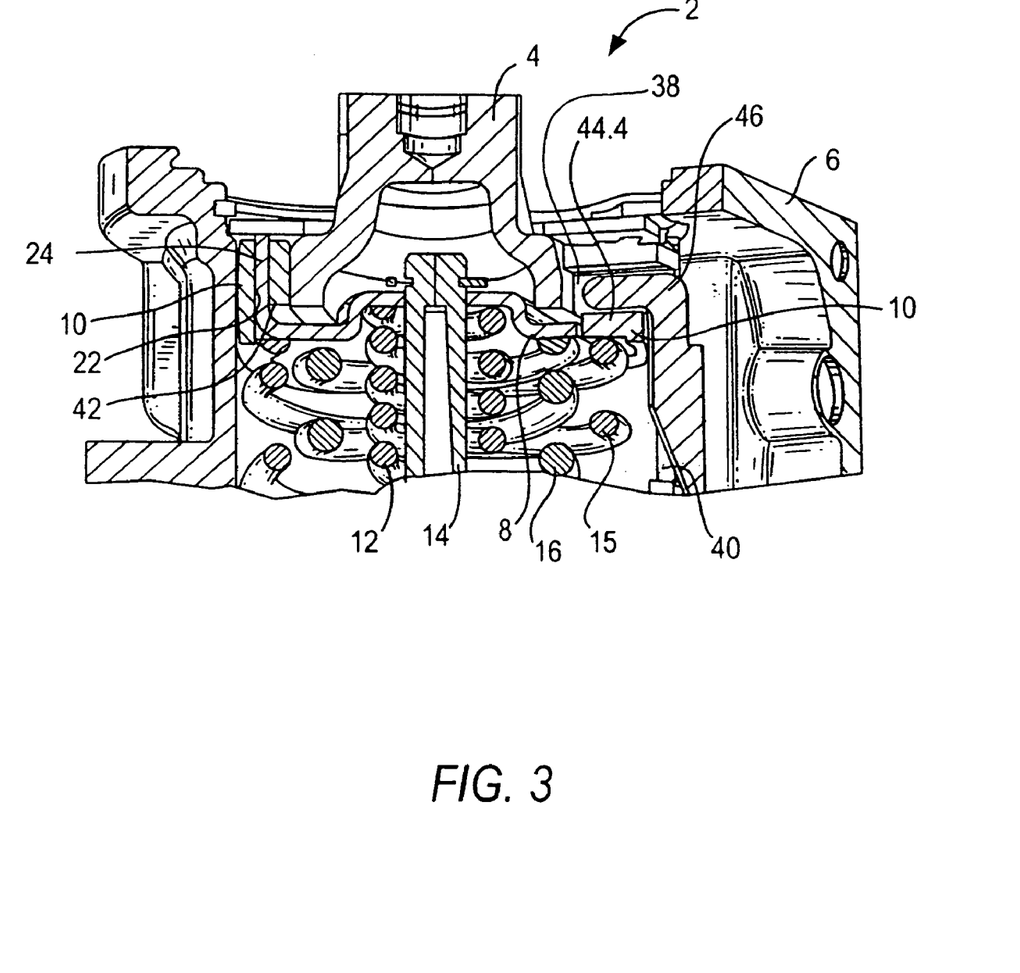
FIG. 3 is a rotated sectional view in three dimensions of the inventive actuating device depicted in FIGS. 1 and 2.

Referring now to the drawing figures where like reference numerals are used for corresponding parts, FIGS. 1–3 show various sectional views of an actuating device of a brake unit 2 of an EBS 58 constructed in accordance with the present invention. The actuating device includes a tappet 4, which is axially displaceable in a housing 6 and can be actuated by the vehicle brake pedal 52 via a mechanical linkage 54. The actuating device further includes a spacer ring 8 which is axially displaceable inside a guide ring 10 which is interlockingly connected with tappet 4. A piston 14 is provided which operates brake valve 56 and can be moved axially by tappet 4 via spacer ring 8 (which makes a slight idling stroke) and a graduating spring 12 braced against piston 14 and against spacer ring 8. An outer return spring 15, braced against guide ring 10 and against a stop, and a feeling spring 16, braced at one end against spacer ring 8 and at the other end against a stop, are integral with the housing.

Guide ring 28 is preferably formed from plastic or like material.

Figure 6:
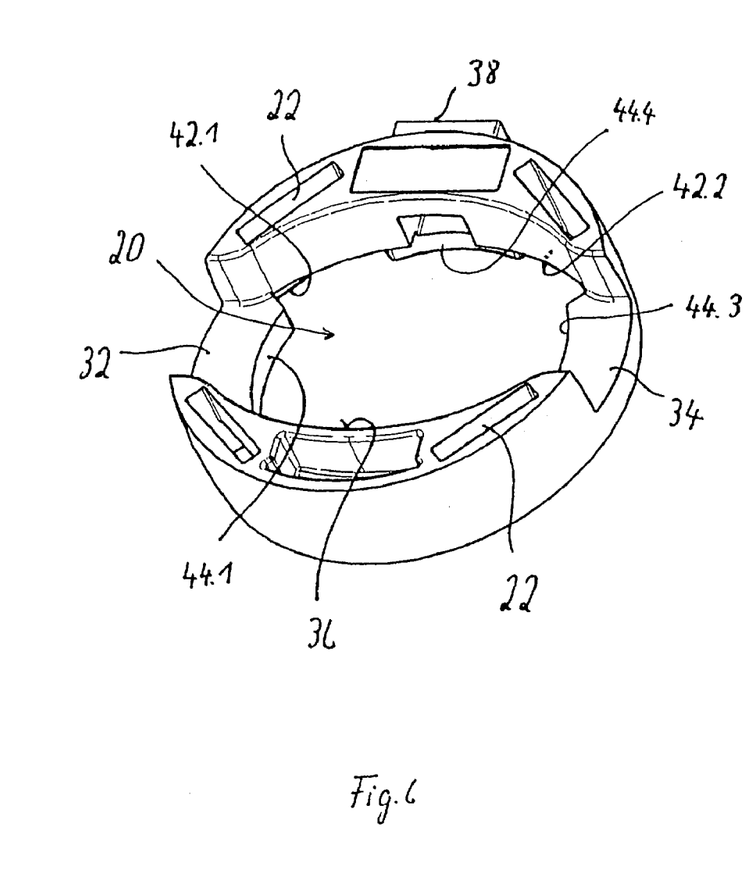
FIG. 6 is a top perspective view of the guide ring employed in the actuating device constructed in accordance with a preferred embodiment of the present invention.

Tappet 4 includes, at the piston end, a base plate 18. Base plate 18 is inserted in a receiver 20 (FIG. 6) of complementary shape formed in guide ring 10. As best depicted in FIG. 6, guide ring 10 includes a plurality of spaced-apart oblong holes 22 which extend in axial direction. Spacer ring 8 includes a plurality of angled edges 24 (FIGS. 2 and 3) which extend into holes 22 and serve to guide the spacer ring in guide ring 10.

Figure 4:
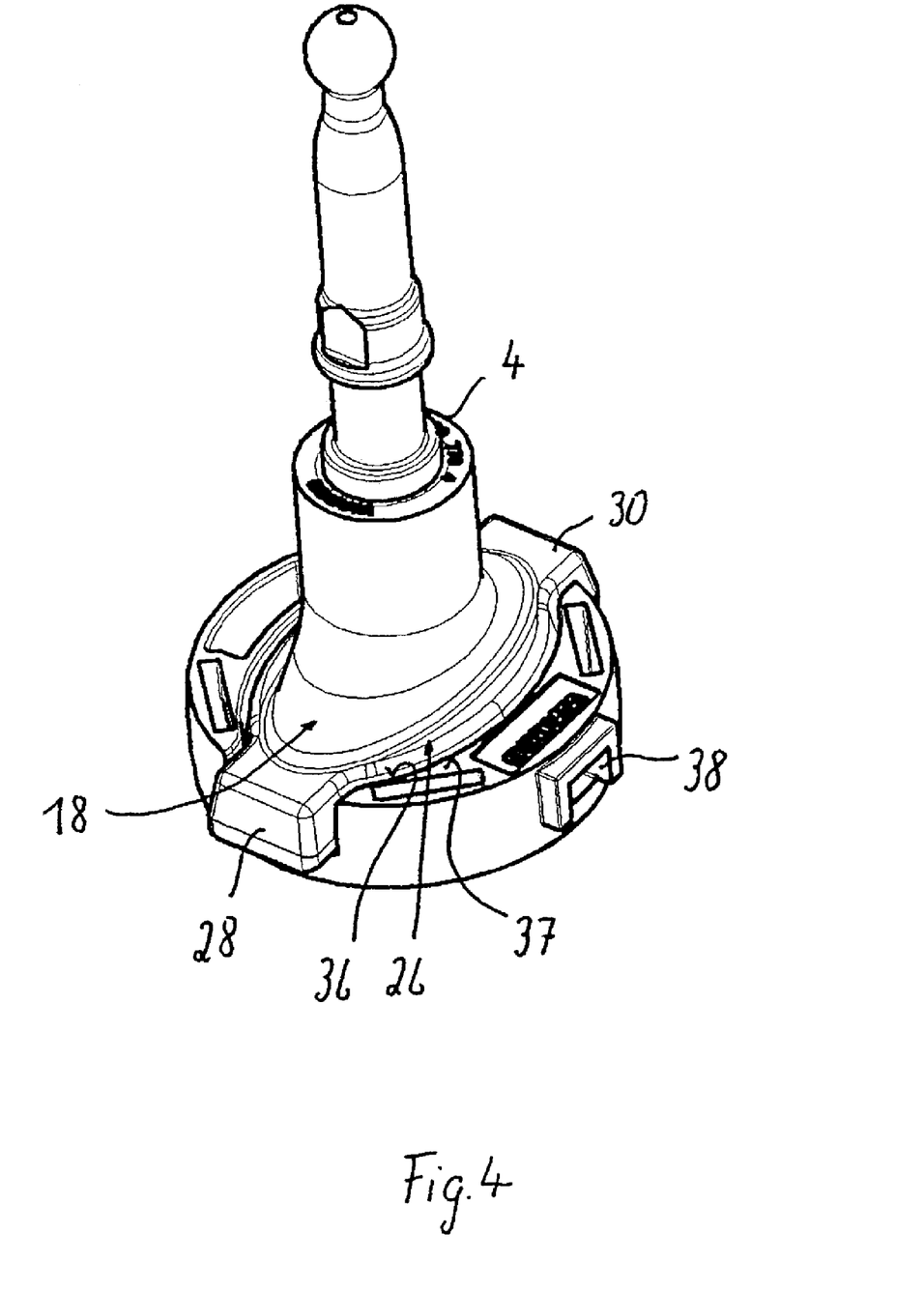
FIG. 4 is a top perspective view of a tappet and guide ring employed in the actuating device constructed in accordance with a preferred embodiment of the present invention.
Figure 5:
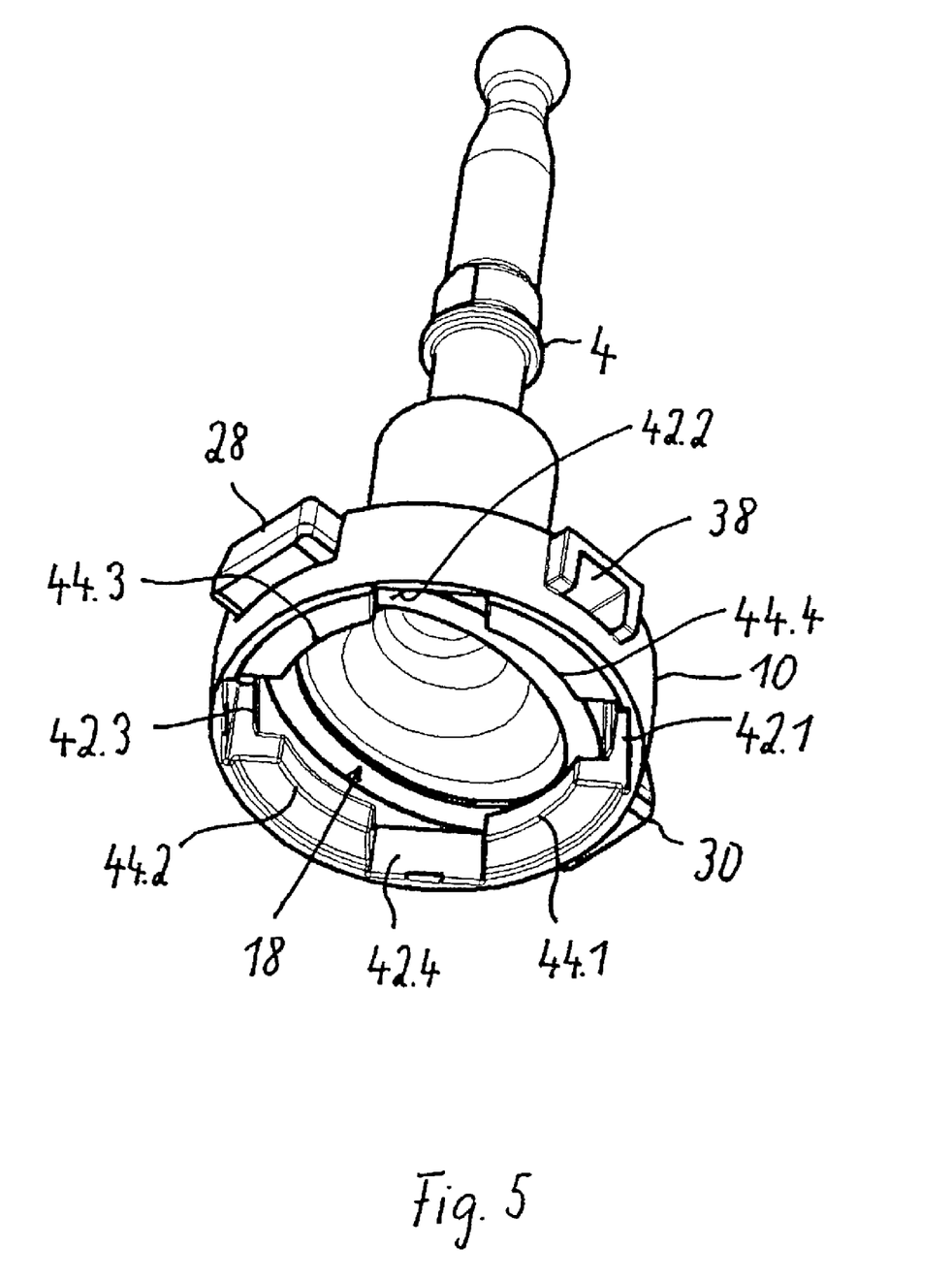
FIG. 5 is a bottom perspective view of the tappet and guide ring depicted in FIG. 4.

Base plate 18 includes a central oval plate-like part 26 (FIG. 4), which, in the direction of the major axis of the oval, is provided with two oppositely disposed, rectangular, protruding arms 28, 30 (FIGS. 4 and 5). Arms 28, 30 are disposed in groove-like recesses 32, 34 (FIG. 6) of guide ring 10 and extend beyond guide ring 10 in radial direction. An inside contour 36 of guide ring 10 corresponds to an outside contour 37 of plate-like part 26 of base plate 18.

It should be understood that while inside contour 36 of guide ring 10 and outside contour 37 of base plate 18 are depicted in the drawing figures as being oval in shape, contours 36 and 37 are not limited to this shape. For example, contours 36 and 37 can be circular, noncircular or polygonal in shape.

Referring to FIG. 6, at right angles to the major axis of the oval defined by inside contour 36 of guide ring 10, or in the direction of the minor axis of the oval, guide ring 10 is provided with a radially oriented rectangular window 38 which protrudes radially outwardly from guide ring 10 (see also, FIG. 5). Window 38, which preferably includes an upper frame part and lateral frame parts, extends into a guide slit 40 formed in housing 6. Guide slit 40 (FIGS. 2 and 3) is provided for receiving and guiding a displacement sensor slide 46. Window 38 receives the end of the displacement sensor slide 46. The displacement sensor slide 46 accordingly follows the movement of tappet 4.

Oblong holes 22 (FIGS. 1 and 6) of guide ring 10 are disposed diagonally in the azimuthal regions between the major and minor axes of the oval defined by inside contour 36 of guide ring 10 to occupy positions between window 38 and groove-like recesses 32, 34, respectively, as well as positions in the diagonally opposing regions of guide ring 10.

Figure 7:
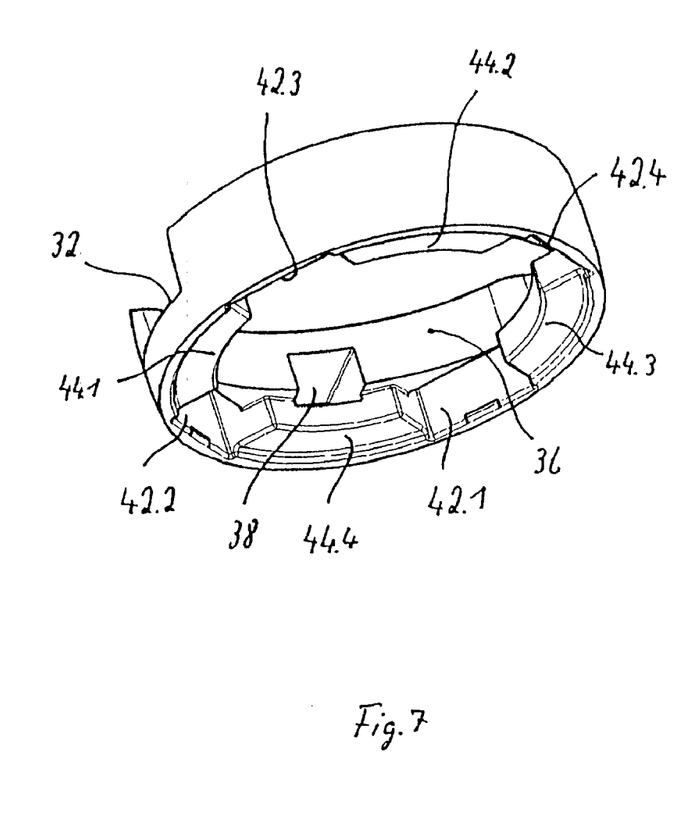
FIG. 7 is a bottom perspective view of the guide ring depicted in FIG. 4.

As best depicted in FIG. 7, in the region of oblong holes 22, the underside of inside contour 36 of guide ring 10 facing spacer ring 8 includes stepped recesses 42.1, 42.2, 42.3, 42.4 extending as far as the oblong holes. The stepped recesses are equal in length to the oblong holes. Segments 44.1, 44.2, 44.3 and 44.4 of partial annular shape exist between the stepped recesses, specifically in the regions of groove-like recesses 32, 34, in the region of window 38 and in the region opposite the window. Return spring 15 bears against these segments. Spacer ring 8 is disposed inside these segments and includes lateral arms 21 (FIG. 2) which end with angled edges 24. Arms 21 extend into stepped recesses 42.1, 42.2, 42.3, 42.4, and angled edges 24 extend into oblong holes 22 of guide ring 10.

Stops 48, 50 (FIG. 1) for arms 28, 30 of base plate 18 of tappet 4 are formed in housing 6 for the purpose of absorbing the relatively large forces associated with actuation of the vehicle brake.

The described construction and arrangement of guide ring 28, of tappet 4 and of spacer ring 8 ensures that guide ring 28 not only guides the tappet relative to housing 6, but also guides spacer ring 8, with its arms 21 and angled edges 24, in oblong holes 22. Window 34 prevents tappet 4 from twisting and thus ensures disturbance-free linking of the displacement sensor slide 46 to the tappet.

Accordingly, the present invention provides an improved actuating device for a brake unit of an EBS having a single guide ring which can be interlockingly connected to the tappet and which, by interaction with associated structure on the tappet and on the spacer ring, axially guides the tappet in the housing and the spacer ring in order to achieve some lost motion (i.e., idling stroke), while simultaneously minimizing friction and eliminating undesired twisting of the tappet about its longitudinal axis to ensure linking of the displacement sensor slide to the tappet. All desired functions are achieved by the invention with only a single component, thus reducing manufacturing, assembly and labor costs. The construction of the tappet can be simplified.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An actuating device for a brake unit of an electronically controlled vehicle brake system, the actuating device comprising a tappet constructed and arranged (i) for positioning in axially displaceable relationship in a housing of the brake unit of the electronically controlled brake system of a vehicle, (ii) for actuating a piston to operate a brake valve of said brake unit, and (iii) for mechanical connection to a brake pedal of said vehicle, said tappet including at an end facing said piston a base plate, a guide ring guided in said housing against rotational movement, said guide ring including a receiving portion for holding said base plate against rotational movement and including spaced-apart holes, a displacement sensor slide movable with said tappet for measuring axial movement of said tappet, a spacer ring disposed in said guide ring for providing a preselected amount of lost motion, said spacer ring including angled edges extending therefrom into said spaced-apart holes, a window protruding radially outwardly from said guide ring into a guide slit defined in said housing for receiving an end of said displacement sensor slide.

2. The actuating device according to claim 1, wherein said base plate has an outside contour and said receiving portion of said guide ring has an inside contour, said outside contour of said base plate and said inside contour of said receiving portion having complementary shapes.

3. The actuating device according to claim 2, wherein said outside contour of said base plate and said inside contour of said guide ring have one of oval, circular, noncircular and polygonal shapes.

4. The actuating device according to claim 1, wherein said guide ring includes recesses and said base plate includes a pair of radially outwardly extending arms disposed in diametrically opposite positions, said arms constructed and arranged to engage said recesses.

5. The actuating device according to claim 4, wherein said arms extend radially outwardly beyond said guide ring.

6. The actuating device according to claim 5, wherein said housing includes a pair of stops for said arms.

7. The actuating device according to claim 1, wherein said guide ring has an underside facing said spacer ring, said underside of said guide ring including stepped recesses extending to said spaced-apart holes, and projections disposed between said stepped recesses.

8. The actuating device according to claim 7, wherein said projections are partial annular segments.

9. The actuating device according to claim 7, wherein said spacer ring is disposed in said guide ring such that said spacer ring is positioned inside said projections.

10. The actuating device according to claim 9, wherein said spacer ring includes lateral arms having ends including angled edges, said arms protruding into said stepped recesses and said angled edges protruding into said spaced-apart holes of said guide ring.

11. The actuating device according to claim 1, wherein said guide ring is formed from plastic.

12. The actuating device according to claim 1, wherein said spaced-apart holes are axially disposed on said guide ring.

13. The actuating device according to claim 1, wherein said spaced-apart holes are oblong in shape.

* * * * *